(12) United States Patent
Andres

(10) Patent No.: US 6,439,984 B1
(45) Date of Patent: Aug. 27, 2002

(54) MOLDED NON-ABRASIVE SUBSTRATE CARRIER FOR USE IN POLISHING OPERATIONS

(75) Inventor: Todd Andres, Austin, TX (US)

(73) Assignee: Entegris, Inc., Chaska, MN (US)

( * ) Notice: Subject to any disclaimer, the term of this patent is extended or adjusted under 35 U.S.C. 154(b) by 0 days.

(21) Appl. No.: 09/397,580

(22) Filed: Sep. 16, 1999

Related U.S. Application Data

(60) Provisional application No. 60/100,529, filed on Sep. 16, 1998.

(51) Int. Cl.⁷ .............................................. B24B 47/02
(52) U.S. Cl. ....................... 451/398; 451/397; 451/400; 264/40.3; 264/85; 264/572; 264/130; 264/149; 264/170
(58) Field of Search ................................ 451/398, 397, 451/400; 264/40.3, 85, 572, 130, 149, 170

(56) References Cited

U.S. PATENT DOCUMENTS

| | | |
|---|---|---|
| 1,361,883 A | 12/1920 | Littman |
| 1,833,329 A | 11/1931 | Packer |
| 1,989,517 A | 1/1935 | Holmes |
| 3,115,091 A | 12/1963 | Hakogi |
| 4,593,496 A | 6/1986 | Klievoneit |
| 5,140,774 A | 8/1992 | Onodera |
| 5,236,656 A * | 8/1993 | Nakajima .................... 264/506 |
| 5,244,555 A | 9/1993 | Allen et al. |
| 5,348,151 A | 9/1994 | Dressen |
| 5,558,824 A * | 9/1996 | Shah et al. ................. 264/40.3 |
| 5,795,532 A * | 8/1998 | Wagner et al. .............. 264/429 |
| 5,882,245 A | 3/1999 | Popovich et al. |
| 5,997,778 A * | 12/1999 | Bulgrin ..................... 264/40.1 |
| 6,089,849 A * | 7/2000 | Bulgrin et al. .............. 425/149 |

* cited by examiner

Primary Examiner—Joseph J. Hail, III
Assistant Examiner—Shantese McDonald
(74) Attorney, Agent, or Firm—Patterson, Thuente, Skaar & Christensen, P.A.

(57) ABSTRACT

Thin, planar substrates are carried on a substrate carrier (20) through a polishing operation. The substrate carrier (20) is injection molded or modified-injection molded from a plastic material, and includes one or more receptacles for receiving the substrates to be carried through the polishing process. A drive force transmission arrangement is also included in the substrate carrier (20) through which the carrier may be driven in the polishing process. The substrate carrier (20) is relatively non-abrasive and composed of melt processable engineering polymers or blends. Non-abrasive fillers or reinforcing material may also be included in the plastic.

13 Claims, 4 Drawing Sheets

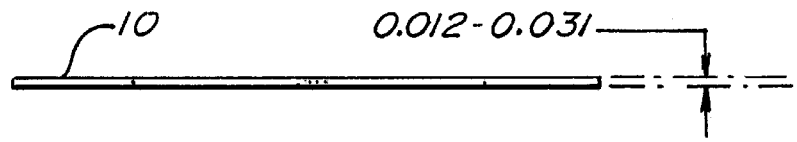
Fig. 1. SUBSTRATE CARRIER
PRIOR ART
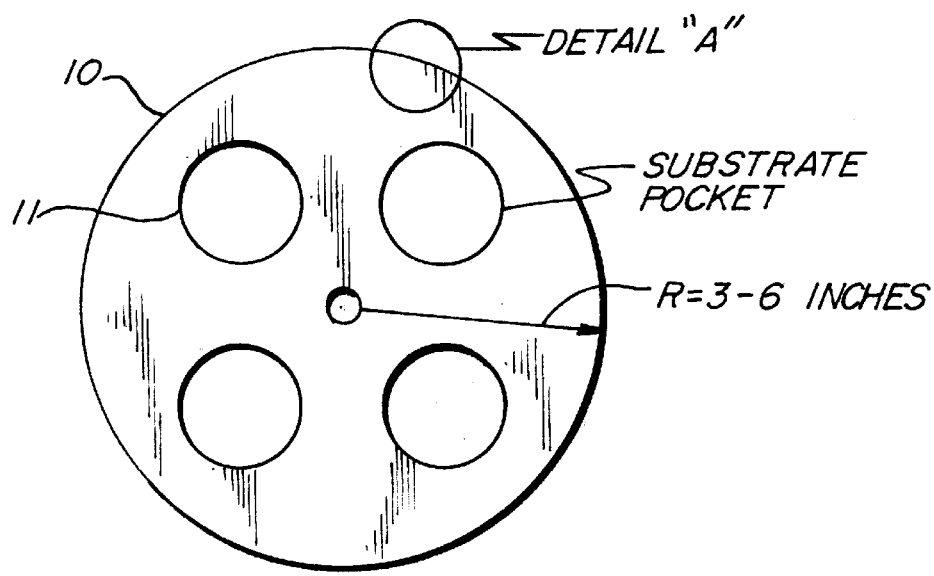
Fig. 2.
PRIOR ART
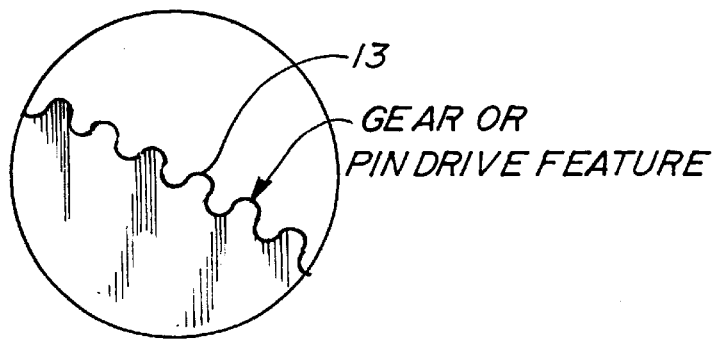
Fig. 3. DETAIL "A"
PRIOR ART

FILL OR OPEN POSITION

DETAIL "A"

SECTION F-F

SECTION G-G

MOLDED NON-ABRASIVE SUBSTRATE CARRIER FOR USE IN POLISHING OPERATIONS

This application claims the benefit of the U.S. provisional patent application Serial No. 60/100,529 filed Sep. 16, 1998, the disclosure of which is incorporated herein by this reference.

TECHNICAL FIELD OF THE INVENTION

The invention relates to substrate carriers used to hold memory disks or wafer substrates during a polishing process, and to methods for manufacturing such carriers.

BACKGROUND OF THE INVENTION

Hard disk drives contain aluminum disks of remarkable smoothness and flatness. Likewise, wafers used to make semiconductors also must have an exceptional surface finish. The aluminum disks and wafers (both referred to as "disks" or "substrates" in this disclosure) must be polished in order to obtain the desired level of smoothness. The preferred polishing process is commonly referred to as chemical-mechanical polishing or CMP.

In the CMP process one or more disks are placed in a consumable thin flat substrate carrier 10 shown in FIGS. 1 and 2. Carrier 10 includes four receptacles or pockets 11 for receiving disks. In the illustrated form of the invention, which is adapted for double sided polishing, each receptacle 11 extends all the way through the carrier material. Other carriers may be adapted for single sided polishing and include receptacles which do not extend all the way through the carrier material. Although four openings 11 are shown for purposes of example, carriers may have any number of disk receiving receptacles or pockets. The radius of the substrate carrier 10 ranges between approximately 3 and 16 inches. The thickness of the carriers 10 must be less than the substrate thickness and generally falls between 0.012 and 0.35 inches.

Disks (not shown) are inserted into the substrate carrier openings 11 and transported by the carrier through the polishing process. The substrate carrier 10 is driven through the process by pins or gears that turn and/or rotate the carrier 10, or perhaps many carriers, around a planetary gear or pin drive (not shown). The illustrated carrier 10 includes a peripheral gear 13 which allows the carrier to be driven through the polishing process.

Prior to the present invention, substrate carriers used during the polishing or grinding process have been made of metals, such as steel and aluminum, or of 'continuous' fiberglass filled epoxy. 'Continuous' means that the actual glass fibers 14 are over several inches in length as seen in FIG. 4. The original metal substrates were replaced by continuous glass mat reinforced thermoset epoxy composites called F4 or G10 as shown in FIG. 4. These epoxy/fiberglass carriers replaced the prior metal carriers in an effort to reduce the quantity of abrasives worn off the substrate carrier during the process. The fiberglass filled epoxy substrate carriers are made by typical thermoset composite lay-up techniques.

The standards for flatness and smoothness of wafers and memory disks continually increases in order to accommodate more information or chip architecture on the memory disks and wafers. As the standards for flatness and smoothness increase, rejection rates have also increased to as much as 40%, attributed to scratches from worn fiberglass particulates released from the epoxy/fiberglass substrate carrier.

As the epoxy/fiberglass carriers wear away, the polymer layer over the fiberglass mat, the wear rate of fiberglass particulates increases. The current epoxy/fiberglass substrate carriers must be replaced at the first signs of wear to avoid rejection rates greater than 40%. A leading manufacturer of hard disks has indicated that scratches attributed to worn fiberglass particulates cause 15% on average of their disks to fail.

The prior art epoxy carriers must have the continuous glass reinforcement 14. These G10 or F4 epoxy carriers without glass materials are of insufficient strength to work as a substrate carrier. Epoxy typically has a tensile strength of less than 5000 psi in the neat form. Current substrate carriers are made with a woven fiberglass mat in the center to give the epoxy carrier higher strength and stiffness as in FIG. 4. Additionally, the fiberglass mat reinforcement of the epoxy carriers has anisotropic stiffness and strength due to the bi-directional orientation of the continuous glass fibers. Fiberglass/epoxy carriers are used in over 95% of the polishing processes for memory disks today.

SUMMARY OF THE INVENTION

It is an object of the invention to provide a substrate carrier which overcomes to above-described problems and others associated with prior substrate carrier used in substrate polishing operations. More particularly, it is an object of the invention to provide a substrate carrier which minimizes the release of particulates which may interfere with the polishing process. Another object of the invention is to provide a method for manufacturing such a substrate carrier.

These objects are accomplished by injection molding a substrate carrier from a plastic material. The plastic material may be either neat or contain non-abrasive reinforcing materials. Molding may comprise traditional injection molding or modified-injection molding in which the mold is maintained in a partially open position during at least part of the plastic injection step.

A substrate carrier according to the invention minimizes the release of materials which may interfere with the polishing operation. Particularly, the molded plastic substrate carriers of the present invention do not release abrasive particulates as the carriers are consumed in the polishing process. The present carriers thus minimize the occurrence of scratches in the substrates and minimize substrate rejection rates after the polishing process.

These and other objects, advantages, and features of the invention will be apparent from the following description of the preferred embodiments, considered along with the accompanying drawings.

BRIEF DESCRIPTION OF THE DRAWINGS

FIG. 1 is a somewhat diagrammatic side view of a prior art substrate carrier, drawn to an exaggerated vertical scale.

FIG. 2 is a top plan view of the prior art substrate carrier shown in FIG. 1.

FIG. 3 is an enlarged partial top plan view of an edge of the prior art substrate carrier shown in FIGS. 1 and 2.

DESCRIPTION OF THE PREFERRED EMBODIMENTS

Figure 4:
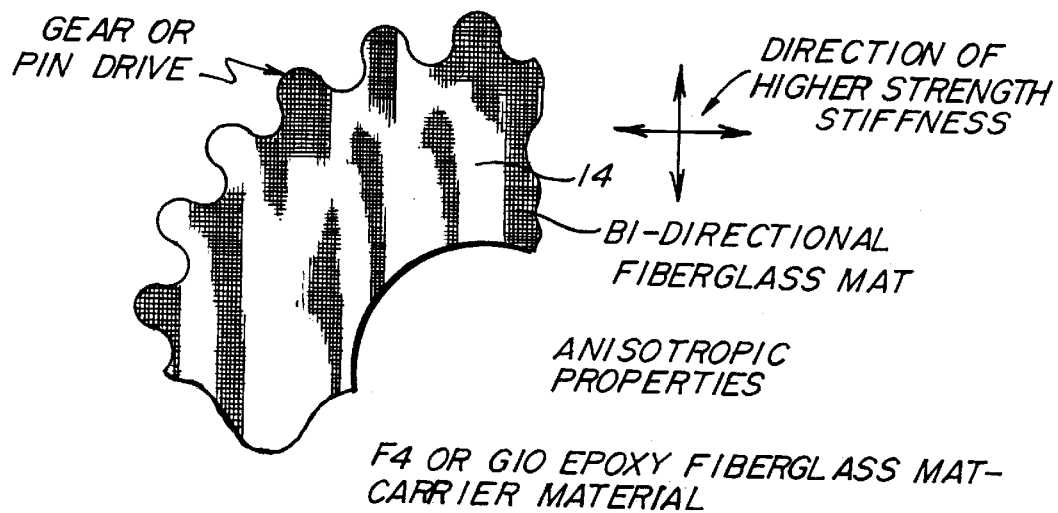
FIG. 4 is a somewhat diagrammatic partial top plan view of a prior art substrate carrier.
Figure 5:
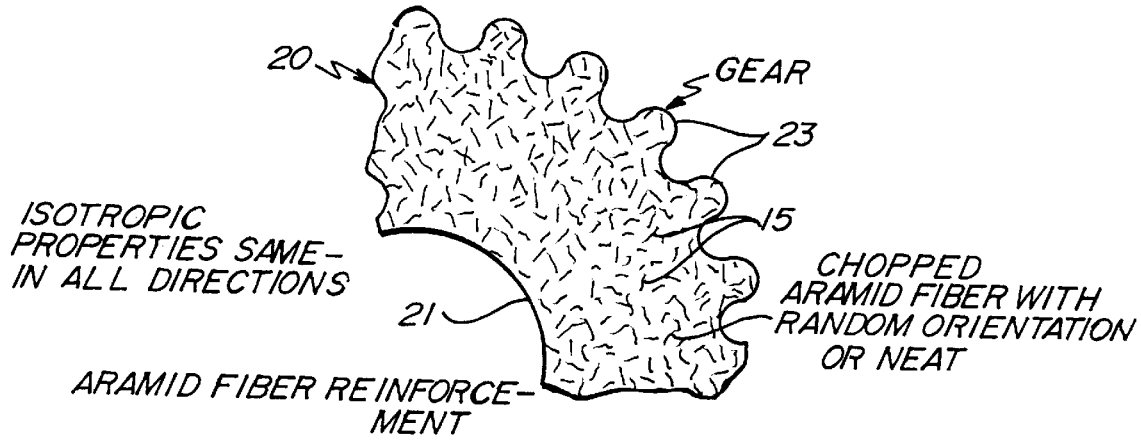
FIG. 5 is a view similar to FIG. 4 showing one preferred form of a substrate carrier according to the invention.

Referring particularly to FIG. 5, this invention comprises a substrate carrier 20 formed from high strength polymers free of abrasive reinforcements. Substrate carrier 20 is similar in shape to the prior art carrier shown in FIGS. 1 through 4. Thus, carrier 20 includes one or more receptacles 21. Each receptacle 21 is adapted for receiving a substrate (not shown) to be carried through a polishing process such as a mechanical polishing process or a chemical-mechanical polishing process. Substrate carrier 20 further includes a drive force transmission arrangement though which a drive force may be applied to the carrier. As shown in FIG. 5, the drive force transmission arrangement may comprise peripheral teeth 23. However, any suitable means may be used to allow a polishing machine to apply a driving force to carrier 20.

The invention also includes methods of economically manufacturing substrate carriers. The substrate carriers according to the invention reduce the release of particulates in the polishing process and thereby decrease scratches and imperfections produced by such particulates. Thus, the substrate carriers according to the present invention reduce the rejection rate of wafers and disks after the polishing step.

The invention requires that the substrate carriers 20 be injection molded, transfer molded, or modified-injection molded. If the carriers 20 are manufactured by injection molding, the materials are limited due to the inability of many plastics to flow sufficiently far to fill out the parts due to the thin cross-sections of the carriers. Carriers 20 range in diameter from approximately 3 to 31 inches and in thickness from approximately 0.012 to 0.035 inches.

The polymers or polymer blends from which substrate carriers 20 are produced according to the invention have a flexural modulus, as defined by ASTM D790 of greater than approximately 300,000 psi, a flexural strength of greater than 13,000 psi and/or a tensile strength greater than 15,000 psi and a tensile modulus greater than 400,000 psi as defined by ASTM D638. Polymer blends with properties lower than those mentioned above tend to fail mechanically due to the high loading in the polishing process. Substrate carriers embodying the principles of the invention may be formed from melt processable polymer blends reinforced with non-abrasive polymer fillers such as aramide polyamide chopped fibers or Kevlar chopped fibers or other high strength chopped or milled non-abrasive fibers 25. Reinforced polymers with non-abrasive fillers such as aramide fiber reinforced polyetheretherketone, liquid crystal polyester, polyethersulfone, polysulfone, thermoplastic polyamide, nylon, and poly(amide-imide) among others are also acceptable substrate carrier materials. These melt processable polymer fiber reinforced thermoplastic substrate carriers have uniform properties due to the random orientation of the chopped high strength polymer fibers. High strength unreinforced polymers such as poly(amide-imide), and high strength nylons are also acceptable. Polyetheretherketone (PEEK) may also be used to form substrate carriers according to the invention, but only with a high level of crystallinity. Unreinforced amorphous PEEK has proven to be unreliable due to properties slightly lower than some of those mentioned above. FIG. 4 shows an example of an aramid reinforced non-abrasive substrate carrier 20 embodying the principles of the invention.

The polymers or polymer blends which are used to produced substrate carriers 20 according to the invention must be melt processable and have properties greater than those mentioned above. Prior art materials do not meet the requirements of the strength factors above and melt processability. We have also found that molded substrate carriers with lubricants blended into the formulation, with the mechanical requirements mentioned above, reduce the wear of particulates and contribute to longer lasting carriers.

Figure 6:
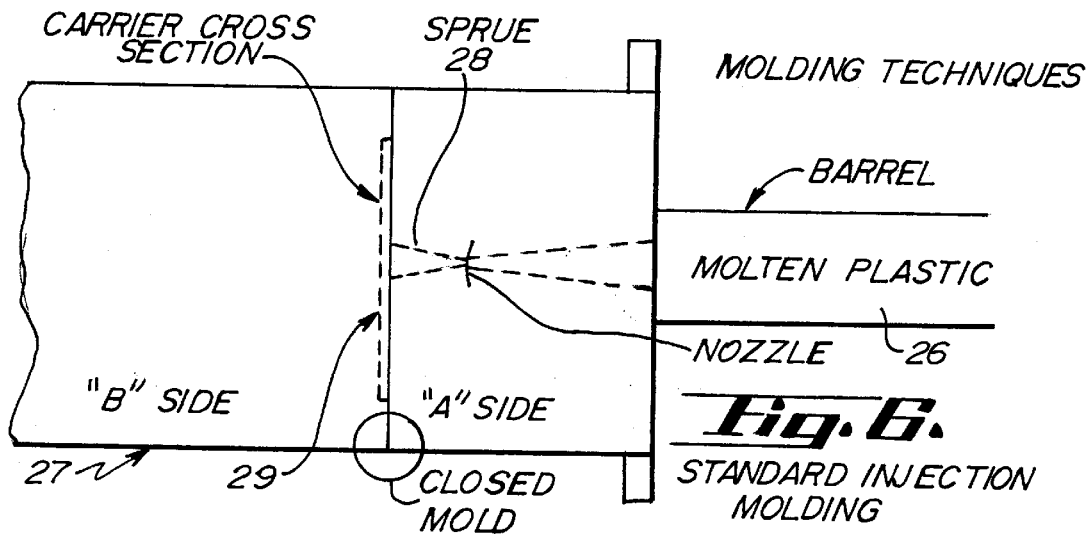
FIG. 6 is a diagrammatic side view of an injection molding apparatus for producing a substrate carrier according to the invention.

Injection molding, shown in FIG. 6, involves flowing molten plastic 26 into the 'A' side of a mold 27 through a sprue 28, and then into the cavity 29 of the mold. Cavity 29 has the shape of the carrier 20, and the plastic cools and solidifies in the cavity to form the desired carrier.

Figure 9:
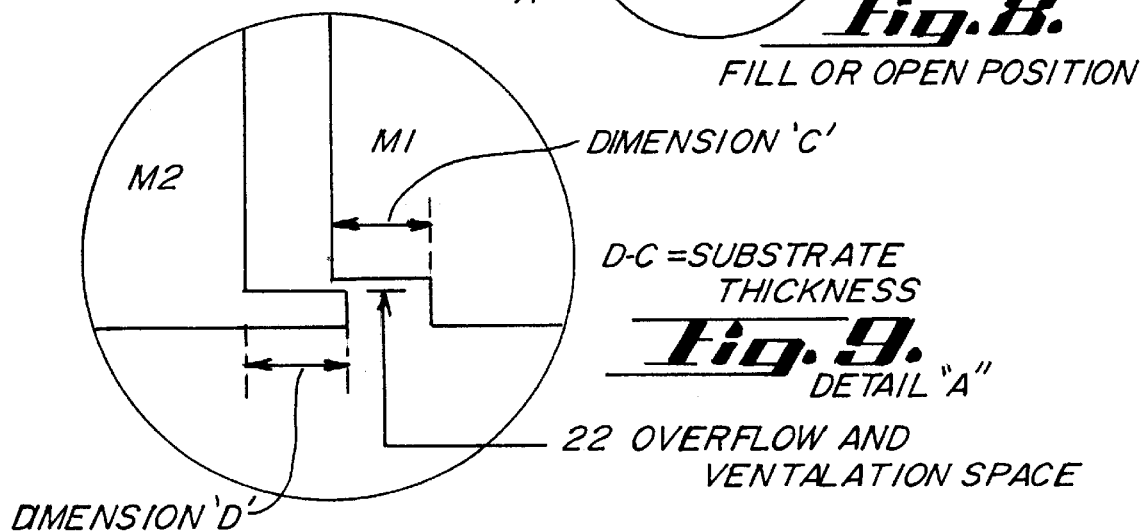
FIG. 9 is an enlarged partial side view showing one edge of the mold shown in FIG. 8.
Figure 10:
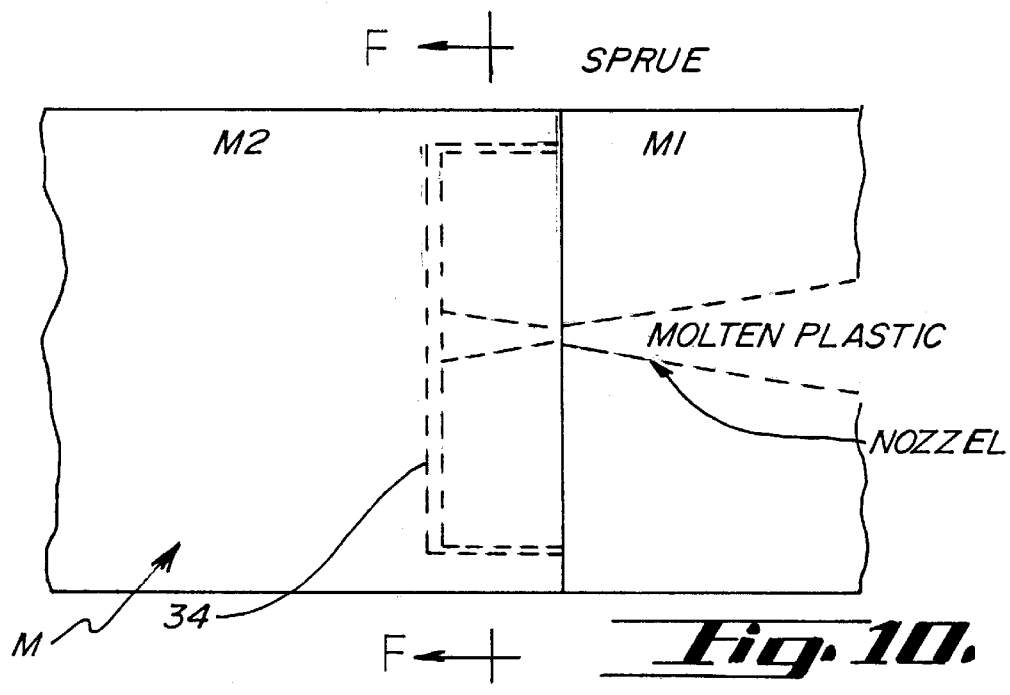
FIG. 10 is a diagrammatic side view of the molding apparatus shown in FIG. 8 in a closed position.
Figure 11:
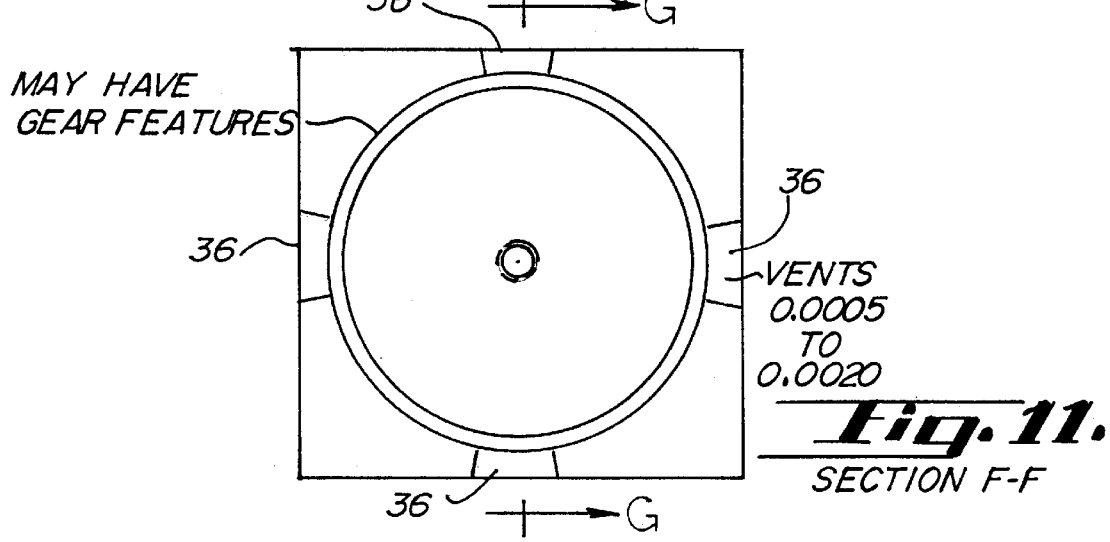
FIG. 11 is a section view taken along line F—F in FIG. 10.
Figure 12:
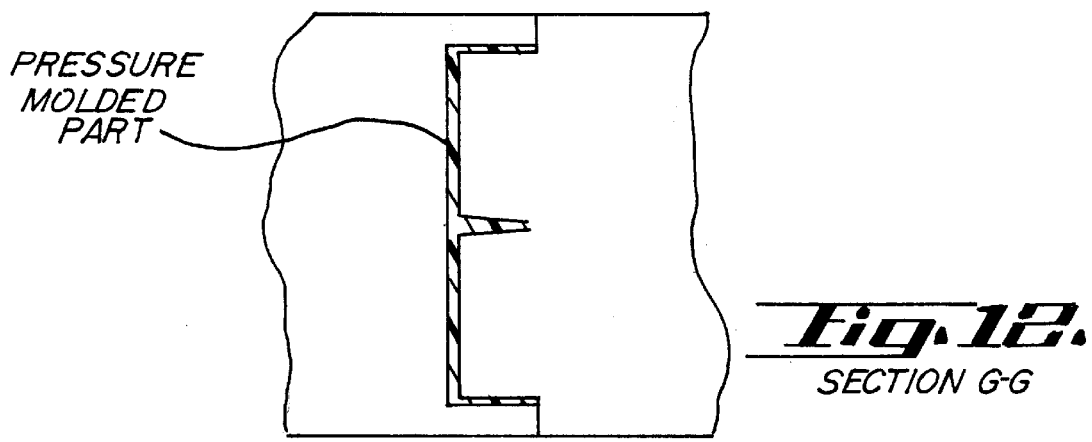
FIG. 12 is a section view taken along line G—G in FIG. 11.

The modified-injection molding process illustrated in FIG. 7 through 12 also uses a mold M having a first side M1 and a second side M2 to form the diameter, thickness, and some of the features of the substrate carrier 20. When using the modified-injection molding techniques, the mold M can be designed with an overflow and ventilation passage 32 around the outside of the part as shown in FIG. 9. The modified injection-molding machine includes a compression step in which the mold is moved from an open to a closed position. Using a modified injection-molding machine, the plastic resin in pellet form is inserted into the hopper of the machine (not shown).

Figure 7:
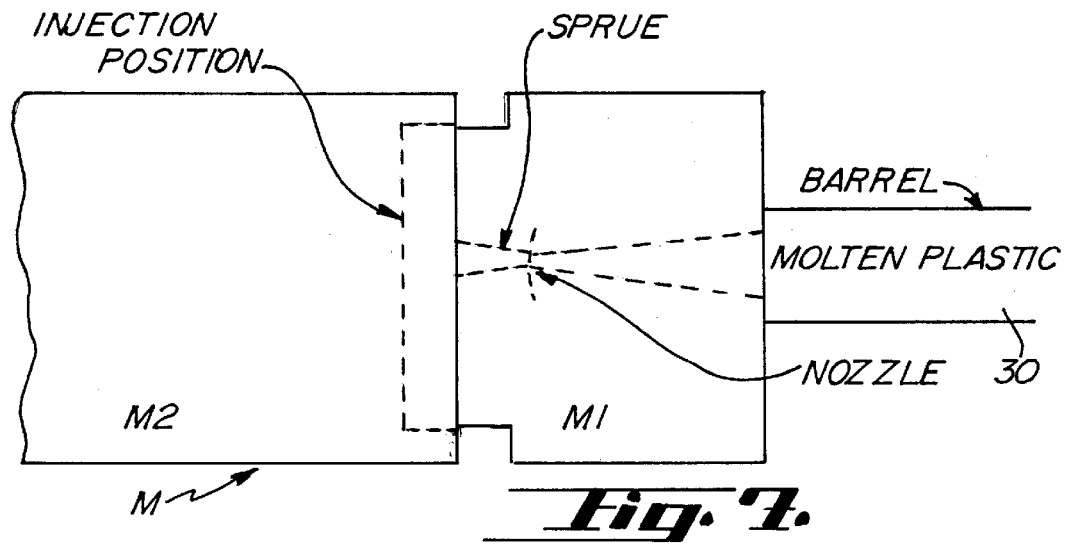
FIG. 7 is a diagrammatic side view of a modified injection molding apparatus for producing a substrate carrier according to the invention.
Figure 8:
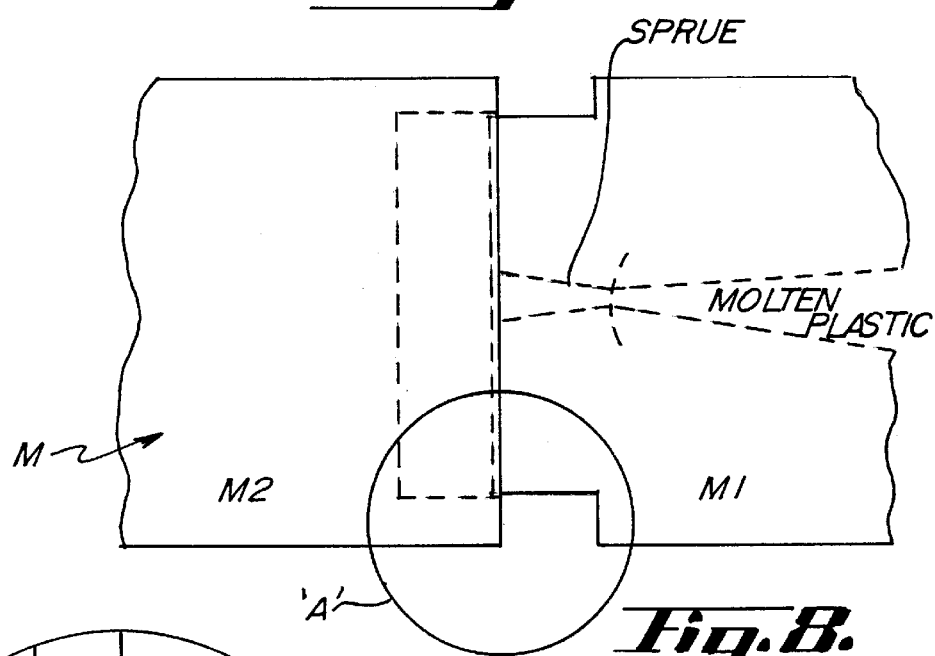
FIG. 8 is a diagrammatic side view similar to FIG. 7 with the mold in the open or injection position.

Modified-injection molding (MIM) process according to the invention is similar to injection molding, but with adjustments made to produce the thin, substantially planar substrate carriers 20. Particularly, the modified-injection molding process may be employed to help maintain the velocity of the molten plastic substantially constant throughout the mold as the mold is filled. Referring to FIG. 7, when the molten plastic 30 is injected into the mold M in the modified-injection molding process, the mold is partially open with the mold sides M1 and M2 separated somewhat. The substrate thickness should be the difference between dimension D and dimension C in FIG. 9. When the molten plastic is being injected into the mold M, or just after injection, when the cavity is full or partially full of molten plastic, the mold is closed to the position shown in FIG. 10 to press the part to full density. In this final closed mold position, the cavity 34 between the mold sides M1 and M2 has the final molded dimensions of the substrate carrier being produced. Preferably immediately after the mold is closed the sprue is mechanically or thermally removed to provide uniform cooling and minimize stress in the product. After the plastic has solidified, the mold cavity opens to eject the part. The part may have all of the finished features molded in, or it may be finish machined to the carrier's final dimensions, and produce features such as the outer gear teeth or positioning slots.

Vents 36 may be used during the mold closure step to prevent air entrapment. The vents 36 shown best in FIG. 11 comprise narrow passageways formed between the mold sides M1 and M2, between about 0.0005 to 0.002 inches in depth depending on the viscosity of the polymer or polymer blend. The closing of the mold forms the substrate carrier within mold cavity 34, and causes more uniform properties and better flatness. This process enables the production of very flat, thin substrate carriers 20 from polymer materials.

The key requirements for the materials used to make substrate carriers according to the invention are high stiffness and strength. These stiffness and strength requirements can be satisfied with two approaches. The first is to use neat advanced melt processable materials of naturally very high strength and modulus. The polymers themselves without reinforcements have very high strength characteristics. The second approach is to use polymers with medium to high strength characteristics, and reinforce these polymers with chopped polymer fibers for high strength.

Any polymer or polymer blend with the following characteristics may be used to produce substrate carriers according to the invention:

(1) Melt-processable: The material must be able to melt and flow in an injection molding machine
(2) Tensile Strength: greater than 11,000 psi
(3) Tensile Modulus: greater than 400,000 psi
(4) Flexural Strength: greater than 13,000 psi
(5) Flexural Modulus: greater than 300,000 psi Substrate carriers made by the MIM process can be made from any number of resins and fillers. Initial testing includes PEEK material with carbon fibers, neat PEEK, PEEK with Aramid fibers, PES with aramid fibers and PTFE, LCP with aramid fibers, neat LCP, and several other polymers. Because these substrate carriers contain less abrasive constituents, the rejection rate will be greatly reduced.

The disk or substrate carrier of the present invention provide the following benefits:

(1) The carrier will not wear abrasive particulates such glass fibers or metallics;
(2) The carrier will increase the production capacity of disk or wafer manufacturers by reduced rejections;
(3) The carrier will reduce the cost of manufacturing hard disks and wafers due to reduced waste from rejections;
(4) The carrier will enable greater areal density for hard drives and finer chip architecture due to smoother surfaces;
(5) The carrier can last longer and eliminate premature replacement, thereby contributing to better capital utilization through increased productivity; and
(6) The carrier has uniform material properties.

Modified-injection molding or injection molding provides a number of benefits. One benefit involves the range of materials available. Modified-injection molding enables a broad selection of plastic resins and fillers. Particular materials may be selected to better fit the needs of a specific polishing application. For example, high viscosity resin systems could not be used to make substrate carriers using tradition injection molding process due to the inability to flow far enough through the thin section of the mold. However, even highly filled resins may be used in the modified-injection molding process give the substrate carrier improved strength and wear resistance.

Injection molding also facilitates the economic manufacture of substrate carriers due to reduced waste as compared with substrate carriers made from film (See FIG. 5). Film generally has a higher cost per unit compared with injection molded or MIM articles due to higher capital equipment costs. Additionally, substrate carriers made from film waste up to 27% more materials compared with the MIM process because the commonly circular substrate carrier must be cut out of a square when manufacturing from film. Parts made by the modified-injection molding process can be made flatter than those machined out of film.

Injection molding and modified-injection molding are significantly less labor intensive than composite lay-up. Furthermore, modified-injection molding in particular may be used to manufacture substrate carriers with exceptional flatness.

EXAMPLES

A mold was made to form the thickness and outside features of a substrate carrier. A disc carrier was then molded from PEEK and other materials using a modified-injection molding process having a pressing step. This process produced a substrate carrier of suitable flatness. Substrate carriers were also machined out of virgin PEEK film to test the PEEK material for durability. These machined PEEK substrate carriers survived the polishing process.

The above described preferred embodiments are intended to illustrate the principles of the invention, but not to limit the scope of the invention. Various other embodiments and modifications to these preferred embodiments may be made by those skilled in the art without departing from the scope of the following claims.

What is claimed is:

1. A carrier for transporting thin, planar objects through a polishing operation, the carrier being prepared by a process comprising the steps of:

(a) forcing a plastic material into a mold while maintaining the mold in at least one partially open position;
   (b) maintaining the plastic material at a substantially constant velocity throughout the volume of the mold as the plastic material is forced into the mold; and
   (c) closing the mold to a fully closed position after the step of injecting the plastic material into the mold has been initiated.

2. The carrier of claim 1 wherein the process further comprises the step of:

(a) closing the mold to a fully closed position while forcing the plastic material into the mold.

3. The carrier of claim 1 wherein the plastic material includes a non-abrasive reinforcement material.

4. The carrier of claim 1 wherein the thickness of the carrier is in the range of approximately 0.012 to 0.035 inches and a width dimension of the carrier is greater than approximately 3 inches.

5. The carrier of claim 1 wherein the plastic material is selected from the group consisting of polyaryetherketone, polyethersulfone, polyetherimide, polysulfone, polyphenylene sulfide, polyimide, nylon, liquid crystal polymer, and polycarbonate.

6. A method of manufacturing a carrier for transporting thin, planar objects through a polishing operation, the process comprising the steps of:

(a) forcing a plastic material into a mold while maintaining the mold in at least one partially open position;
   (b) maintaining the plastic material at a substantially constant velocity throughout the volume of the mold as the plastic material is forced into the mold; and
   (c) closing the mold to a fully closed position after the step of injecting the plastic material into the mold has been initiated.

7. The method of claim 6 wherein the process further comprises the step of:

(a) separating a sprue from the mold immediately after the mold is filled with the plastic material.

8. The method of claim 6 wherein the plastic material includes a non-abrasive reinforcement material.

9. The method of claim 6 wherein the thickness of the carrier is in the range of approximately 0.012 to 0.035 inches and a width dimension of the carrier is greater than approximately 3 inches.

10. A method of manufacturing a carrier for transporting thin, planar objects through a polishing operation, the process comprising the steps of:
(a) forcing a plastic material into a mold while maintaining the mold in at least one partially open position; and
(b) closing the mold to a filly closed position after the step of forcing the plastic material into the mold has been initiated.

11. The method of claim 10, and further comprising separating a sprue from the mold immediately after the mold is filled with the plastic material.

12. The method of claim 10, wherein the plastic material includes a non-abrasive reinforcement material.

13. The method of claim 10, wherein a thickness of the carrier is in the range of approximately 0.012 to 0.035 inches and a width dimension of the carrier is greater than approximately 3 inches.

* * * * *